United States Patent [19]

Higgs

[11] 4,052,308
[45] Oct. 4, 1977

[54] CONTAMINATION ENTRAPMENT AND CLEANING DEVICE FOR MOTOR VEHICLE ENGINE LIQUID COOLING SYSTEM COOLANT

[76] Inventor: Edward Wilford Higgs, 124 S. 250 E., N. Salt Lake, Utah 84054

[21] Appl. No.: 607,729

[22] Filed: Aug. 25, 1975

[51] Int. Cl.² .............................................. B01D 29/42
[52] U.S. Cl. ................................. 210/167; 210/433 R; 210/448
[58] Field of Search ...................... 123/41.44; 210/137, 210/167, 433 R, 448, 451, 452, 450, 435

[56] References Cited
U.S. PATENT DOCUMENTS

| | | | |
|---|---|---|---|
| 1,832,776 | 11/1931 | Hudson | 210/167 X |
| 3,441,139 | 4/1969 | McCormick | 210/448 X |
| 3,506,132 | 4/1970 | Boozer | 210/448 |
| 3,941,697 | 5/1976 | Johnson | 210/167 |

*Primary Examiner*—Frank A. Spear, Jr.
*Assistant Examiner*—Richard W. Burks

[57] ABSTRACT

A self supporting-one piece resilient metal wire cloth filter having an integral and permanent bypass opening (window), the filter being removably disposed in the inlet duct of an internal combustion engine radiator. The filter can be removed, flushed, and reinstalled to remove foreign particles entrained with the liquid coolant as the latter circulates, thus permitting continued high efficiency of heat transfer from the hot cylinder to the coolant and from the coolant to the radiator core.

1 Claim, 6 Drawing Figures

CONTAMINATION ENTRAPMENT AND CLEANING DEVICE FOR MOTOR VEHICLE ENGINE LIQUID COOLING SYSTEM COOLANT

BACKGROUND OF THE INVENTION

Contaminant particles are present in the cooling systems of all internal combustion engines. With new engines, the contaminant may be residual core sand or machined metal particles. Deposits of hard water minerals, rust, salts, and sludge form in use which deteriorate the heat transfer coefficient between the hot cylinder walls and the coolant and between the coolant and the radiator core resulting in reduced heat exchange to the coolant and from the coolant to the radiator. Engine overheating then occurs. The entrained particles if not removed precipitate from solution as deposits. Filtered coolant is just as vital to engine longevity as are fuel and oil filtering now in universal use.

The primary purpose of devising the present invention is to provide a simple, inexpensive filter to perform the filtering function and one that is trustworthy in assuring full flow bypass capability when the filtering surfaces become clogged in normal operation, while requiring flushing as the only maintainance for reuse.

SUMMARY OF INVENTION

The specific embodiment of my invention comprises a conical shaped engine coolant filter which is a self supporting-one piece resilient structure, hollow on the inside to provide a particle gathering volume. A specially sized bypass window is integral that assures uninhibited coolant mass flow even when filled to capacity with contaminant. The large bypass virtually eliminates the likelyhood of inhibited coolant flow which can occur if numerous small openings are used for a bypass. The present filter cannot be clogged by particles passable through a wide open thermastat. A trustworthy bypass is vital to the filtering function because a layer of contaminant has been observed to occur in a few minutes of operation, clogging the filtering surface and small bypass holes, rather than the contaminant accumulating at the apex of the cone. The filter is precisely sized to fit snugly within the coolant duct. The present arrangement uses no fittings or backup support that add needless complexity. The filter is removably disposed in the radiator inlet line for flushing. The present filter can be flushed at any convenient time without concern of an overheated engine. Flushing is the only maintainance required for continued use.

DESCRIPTION OF PREFERRED EMBODIMENT

Figure 1:
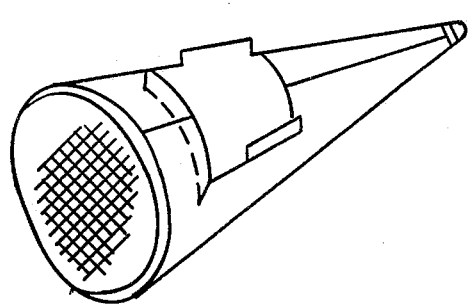
FIG. 1 is a perspective view of the filter.
Figure 2:
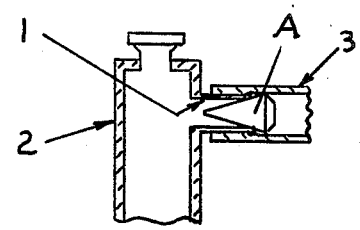
FIG. 2 is a crossection view of the radiator inlet showing preferred placement of the filter.
Figure 3:
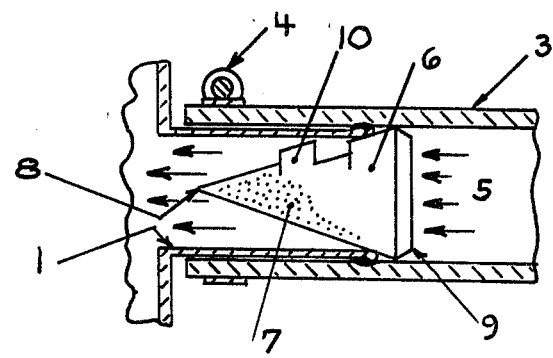
FIG. 3 is an enlargement of the radiator inlet showing details of the filter installation.
Figure 4:
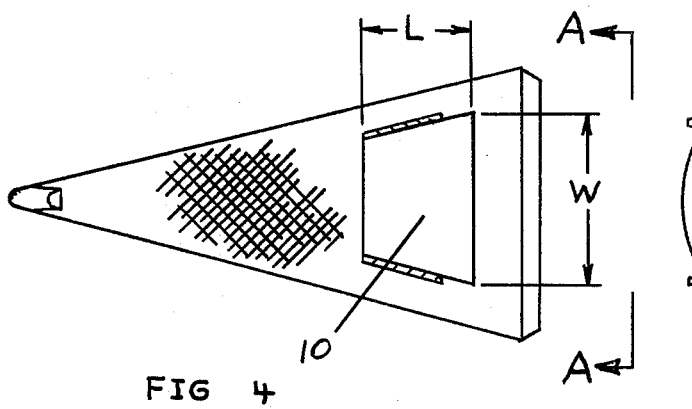
FIG. 4 is a top view of the filter showing critical dimensions.
Figure 5:
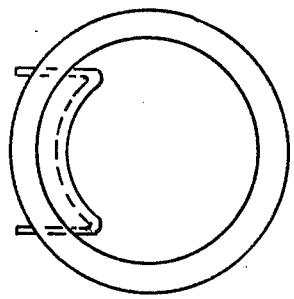
FIG. 5 is a frontal view A—A from FIG. 4.
Figure 6:
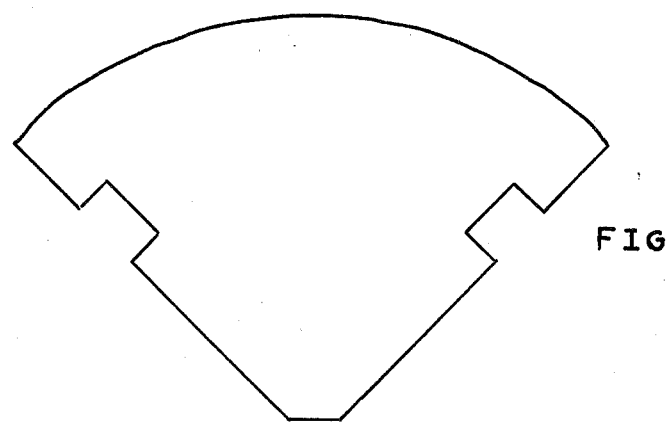
FIG. 6 is a view of a typical pattern for manufacturing the filter.

A filter A is shown in FIG. 1 that is removably installed within the radiator inlet duct 1 shown in FIG. 2 and FIG. 3 which duct extends rearwardly from the upper portion of a known automotive radiator 2. The hose 3 is removably held in sealing engagement on inlet duct 1 by a known clamp 4 as shown on FIG. 2 and FIG. 3. The radiator 2 functions as a heat exchanger for the engine (not shown) coolant. The radiator receives heated coolant arrow 5 from the engine and functions to cool said coolant and the coolant is returned to the engine through an exit duct (not shown).

The filter A preferably formed of a corrosion resistant metal wire cloth like stainless steel receives the coolant into the hollow cavity 6 and permits the coolant to flow therethrough but particles 7 of foreign material such as sand, rust, or sludge or the like entrained in the coolant are trapped within filter A.

The filter A as shown in FIG. 3 has an apex portion 8 and a base portion 9 with the base portion having a precisely sized diameter slightly larger than the inside of the inlet duct 1 such that the filter is disposed snugly within the duct and secured in position.

Installation of the filter is accomplished by loosening clamp 4 and sliding hose 3 off inlet duct 1. Filter A is then installed in duct 1, apex first and bypass window facing up and pressed snugly within duct 1. Hose 3 is then slid over duct 1 and secured by clamp 4.

In operation, a pump (not shown) circulates coolant, arrow 5 through hose 3 in direction of arrow 5 and filter A captures particles 7 entrained in the coolant. The filter is designed with a bypass opening 10 of a size that is equal to or greater than the open area of the thermastat (not shown). Filter A captures all particles but will not inhibit coolant flow rate even if the filtering surface becomes clogged in normal operation and will permit particles able to pass through a wide open thermastat to pass through if not captured. Particles will be captured or bypassed and if bypassed, will be subject to entrapment during subsequent circulation. In any event, the permanent bypass crossection area is equal or larger than that of a wide open thermostat.

Periodically the filter A should be removed, flushed and reinstalled in the position shown in FIG. 2 and FIG. 3 and is again used until flushing is again desired. In this manner, the heat exchange function of the radiator 2 and coolant can be properly maintained at the design level of efficiency.

Having described my invention, I claim:

1. A filtering device installed in the radiator inlet of an internal combustion engine cooling system comprising a self supporting, hollow, conical, one piece metal wire cloth filter means which has its longitudinal axis disposed parallel to the coolant duct and having an integral bypass consisting of an opening in the uppermost portion of said conical filter means said opening being of a size such that any particle passing through an open thermostat will be captured or bypassed without reducing coolant flow rate in either event even when the filtering surface becomes clogged in normal operation.

* * * * *